US005536924A

United States Patent [19]
Ackley

[11] Patent Number: 5,536,924
[45] Date of Patent: Jul. 16, 1996

[54] METHOD AND APPARATUS FOR MATRIX SYMBOLOGY IMAGER

[75] Inventor: H. Sprague Ackley, Seattle, Wash.

[73] Assignee: Intermec Corporation, Everett, Wash.

[21] Appl. No.: 255,002

[22] Filed: Jun. 7, 1994

[51] Int. Cl.⁶ ................................................. G06K 7/10
[52] U.S. Cl. .......................................... 235/454; 235/470
[58] Field of Search ................................... 235/454, 456, 235/470, 471; 250/569

[56] References Cited

U.S. PATENT DOCUMENTS

| | | | |
|---|---|---|---|
| 3,169,186 | 2/1965 | Howard | 235/470 |
| 3,671,720 | 6/1972 | White et al. | 235/454 |
| 3,953,712 | 4/1976 | Horvath | 235/449 |
| 3,990,044 | 11/1976 | Fahey et al. | |
| 4,408,120 | 10/1983 | Hara et al. | 235/462 |
| 5,053,612 | 10/1991 | Pielemeier et al. | 235/462 |
| 5,128,528 | 7/1992 | Heninger | 235/470 |
| 5,140,146 | 8/1992 | Metlitsky et al. | 235/462 |
| 5,247,162 | 9/1993 | Swartz et al. | 235/472 |

FOREIGN PATENT DOCUMENTS

| | | | |
|---|---|---|---|
| 18241 | 2/1979 | Japan | 235/454 |
| 78894 | 4/1991 | Japan | 235/454 |

*Primary Examiner*—John Shepperd
*Attorney, Agent, or Firm*—Graham & James

[57] ABSTRACT

A two-dimensional matrix symbology reader comprises a fixed housing having a slot disposed in a side of the housing to receive a card medium having a two-dimensional matrix symbology affixed thereto. The matrix symbology is illuminated within the housing once the medium has reached maximum axial extent of the slot. An aperture is disposed within the housing adjacent to the slot relative to the matrix symbology such that the light reflected from the matrix symbology is transmitted therethrough. The reflected light is then converted to information signals representative of the matrix symbology. Due to the controlled environment and uniform depth of field requirement within the housing, a pin hole aperture or lens can be utilized without the need for additional focusing or aperture control.

21 Claims, 1 Drawing Sheet

U.S. Patent      Jul. 16, 1996      5,536,924
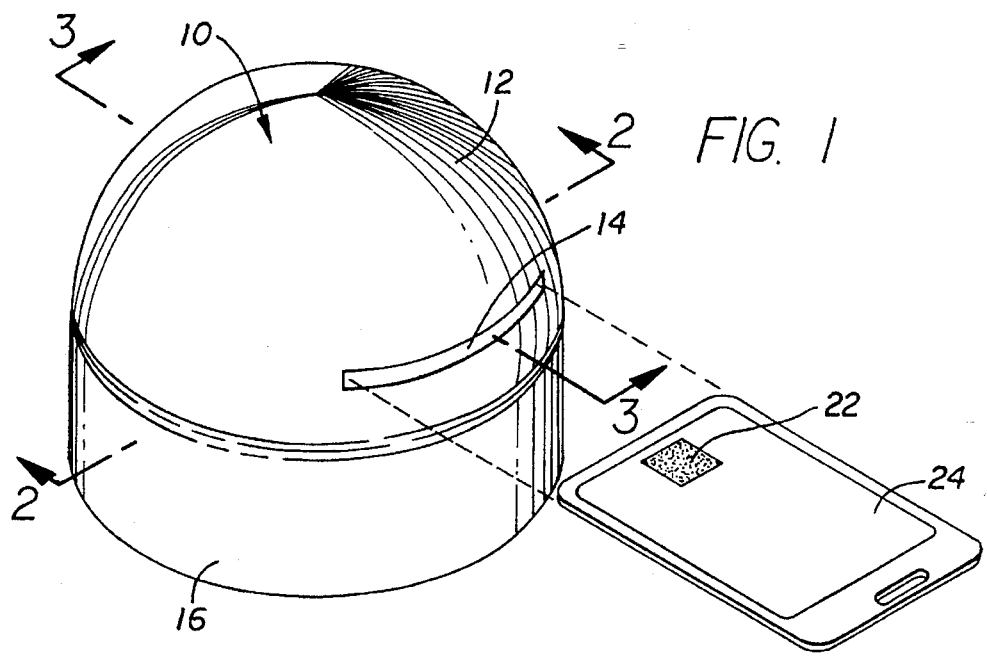
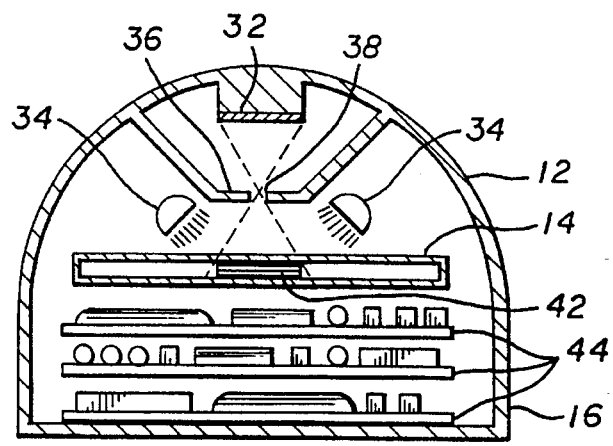
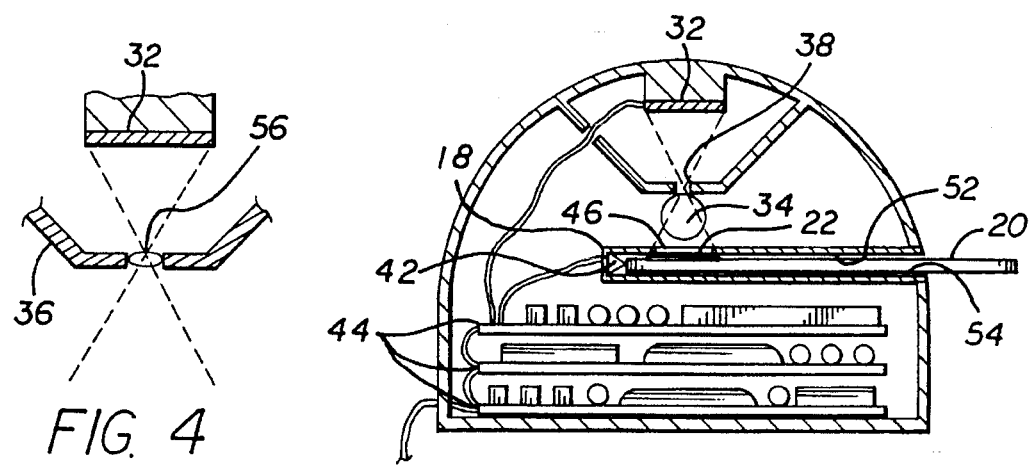

METHOD AND APPARATUS FOR MATRIX SYMBOLOGY IMAGER

BACKGROUND OF THE INVENTION

1. Field of the Invention

The present invention relates to electro-optical imagers for reading a two-dimensional matrix symbology, and more particularly, to a fixed position, high resolution imager utilizing a pin hole aperture or lens.

2. Description of Related Art

Optical imaging systems are commonly used to decipher data symbols printed on objects in order to identify the objects. A bar code symbol represents a popular form of symbology, and typically comprises a pattern of vertical bars of various widths separated by spaces of various widths. Since the bar and space elements have different light reflecting characteristics, a reader can convert the symbology into an electrical signal by analyzing the light reflected from the symbol. The electrical signal can then be decoded to provide an alphanumeric representation of the symbol which identifies the object. Bar code symbology of this nature are commonly used in various applications, such as inventory control, point of sale identification, or logistical tracking systems.

The bar code reader typically uses light that is scanned across the bar code field. The light may be laser light or light from other types of sources. Since the bar code symbology is often disposed on the object to be identified, it is desirable for the reader to be included in a hand held or portable device so that the reader can be brought to the object. Light emitting diodes (LEDs) are commonly utilized to provide the light due to their light weight and low power requirements. The operator can physically move the LED across the bar code field, such as by use of a light pen. Alternatively, a bar code reader may include movable mirrors that automatically articulate a laser light back and forth at a high rate to scan across the bar code field. The operator would normally be provided with a feedback signal, such as an audible tone, that alerts the operator as to the successful completion of a bar code reading operation.

Light weight, hand held readers are desirable for many applications, but there are several drawbacks to the use of such portable readers. Environmental variables can hinder the reading of bar code data, including: (a) the relative distance between the object to be read and the reader; (b) the orientation of the object with respect to the reader; (c) the presence of dust or dirt obscuring the bar code and/or the laser source; (d) bar code print quality inconsistencies; and (e) the intensity of ambient light altering the reflected characteristic of the light from the light source. Sophisticated readers accommodate some of these environmental variables by including lenses for focusing the light at a desired range, and apertures which adjust for the amplitude of the reflected light. While such techniques increase the ability of the reader to accurately read the bar code, the complexity of the device also increases, thus increasing the size, weight and cost of the reader.

Conventional bar code symbology has another significant drawback in that it requires a relatively large amount of space to convey a correspondingly small amount of data. Depending on the particular bar code symbology utilized, a single character of information may require numerous bars and/or spaces. To increase the amount of information presented, the width of the bar code field can be increased, however, this similarly increases the susceptibility of the reader to the environmental variables discussed above, thus increasing the difficulty of reading the data. Further, excessively wide bar codes would occupy an inordinate amount of space on the object and would be impractical for many applications. In view of these drawbacks with conventional bar code, alternative symbologies have been sought.

One such alternative symbology comprises a two-dimensional matrix that occupies a uniform amount of space with a generally rectangular or square shape. Instead of bars and spaces, round or square dots disposed at particular rows and columns of the matrix correspond to the characters being conveyed. As a result, a matrix symbology can compress significantly more data into a given amount of space than a conventional bar code. For example, a matrix symbology printed in a half inch by half inch square could convey up to two hundred characters of information. A two-dimensional matrix symbology and an associated imager is disclosed in U.S. Pat. No. 5,128,528, to Heninger.

Matrix symbology imagers convert the matrix into pixel information that is deciphered into the alphanumeric information represented by the matrix. Such imagers often utilize charge-coupled device (CCD) technology to convert optical information from the matrix into an electrical signal representation of the matrix. Unfortunately, these imagers are susceptible to the same environmental variables that afflict conventional bar code readers. Moreover, to successfully image the matrix symbology, the imager must be capable of determining the rotational orientation of the matrix. A reference symbol disposed adjacent to the matrix, such as an L or T-shaped character, can provide rotational orientation information. As with bar code readers, however, overcoming these environmental variables increases the complexity of such systems.

Accordingly, a critical need exists for a low cost, low complexity symbology imager that permits the communication of a relatively large amount of information while avoiding the complexity and drawbacks of conventional hand held bar code readers.

SUMMARY OF THE INVENTION

In accordance with the teachings of this invention, a fixed position, two-dimensional matrix symbology imager is provided. By disposing the matrix symbology at a uniform location within a controlled environment, all of the environmental problems experienced with traditional bar code readers can be effectively avoided while, at the same time, conveying a far greater amount of useful information.

A two-dimensional matrix symbology imager of the present invention is disposed within a fixed housing having a slot in a side of the housing to receive a card medium having a matrix symbology affixed thereto. The matrix symbology is illuminated within the housing once the medium has reached the maximum axial extent of the slot. An aperture is disposed within the housing adjacent to the slot relative to the matrix symbology such that the light reflected from the matrix symbology is transmitted therethrough. The reflected light is then converted to information signals representative of the matrix symbology. Due to the controlled environment and uniform depth of field requirement, a pin hole aperture or lens can be utilized without the need for additional focusing or aperture control.

More particularly, the medium containing the matrix symbology can be an identification card, badge, or other document. A position sensor is disposed within the slot at the axial extent thereof. The position sensor detects the presence of the medium at the axial extent and produces an associated signal. A light emitting device, such as a light emitting diode (LED), is triggered by the signal from the position sensor. The reflected light is transmitted onto a charge coupled device (CCD) that converts the reflected information into pixel data representative of the dot locations within the matrix.

A more complete understanding of the two-dimensional matrix symbology imager will be afforded to those skilled in the art, as well as a realization of additional advantages and objects thereof, by consideration of the following detailed description of the preferred embodiment. Reference will be made to the appended sheets of drawings which will first be described briefly.

BRIEF DESCRIPTION OF THE DRAWINGS

FIG. 1 is a perspective view of a two-dimensional matrix symbology imager of the present invention, receiving a card containing a matrix symbology;

FIG. 2 is a sectional front view of the matrix symbology imager as taken through the section 2—2 of FIG. 1;

FIG. 3 is a sectional side view of the matrix symbology imager as taken through the section 3—3 of FIG. 1; and FIG. 4 is a partial sectional front view as in FIG. 2 illustrating a lens.

DETAILED DESCRIPTION OF THE PREFERRED EMBODIMENT

This invention provides a low cost, low complexity matrix symbology imager that permits the communication of a relatively large amount of information while avoiding the complexity and drawbacks of conventional bar code readers.

Referring first to FIG. 1, a matrix symbology imager 10 is illustrated. The imager 10 is illustrated as having a dome shaped housing 12 with a cylindrically shaped base portion 16, although alternative shapes are equally feasible, such as rectangular. The dome 12 and base 16 may be a unitary construction, or may be separately constructed elements that are assembled together. The base portion 16 is intended to be fixedly attached to an external structure, such as a table, post, or wall. Alternatively, the imager 10 may be detached from such external structures so that it may operated in a hand held manner. It is anticipated that the dome 12 and base 16 be constructed of light weight, high strength materials, such as high impact plastic.

The imager 10 is intended for use with a card 20. The card 20 of FIG. 1 has a matrix symbology 22 disposed centrally at an end portion thereof. As will be apparent from the description which follows, the precise location and orientation of the matrix symbology 22 on the card is not critical so long as the same location and orientation is utilized for all such cards bearing the symbology. The card may further include a blank portion 4 for use in disposing other graphic or textual information, including photographs or other types of symbols. An end of the card 20 opposite to the matrix symbology 22 may include a hole 26 for attachment of connecting rings, clips or other devices for attaching the card to objects or persons. It is anticipated that the card 20 comprise a personal identification card, license, badge, medical record, manufacturing traveler, and the like.

The imager 10 further comprises a slot 14 for receiving the card 20. The slot 14 is dimensioned commensurate with the card 20, having a width and height corresponding to the width and height of the card. In the embodiment of FIG. 1, the slot has a relatively narrow height, such as approximately ¼ inch, and a width of approximately two (2) inches. The operator inserts the card 20 fully into the slot 14 so that the matrix symbology 22 can be read by the imager 10.

Referring now to FIGS. 2 and 3, the internal aspects of the imager 10 are illustrated. An optical sensor 32 is suspended from an upper internal surface of the dome 12. It is anticipated that the optical sensor 32 be a charge coupled device (CCD), or other high speed, high density data storage medium capable of directly converting optical information into pixel data. The optical sensor 32 is completely shielded from ambient sources of illumination by a shield 36 having an aperture 38. The aperture 38 is disposed tangentially with respect to the plane of the optical sensor 32 so that light information can be transmitted through the aperture onto the surface of the optical sensor. The aperture 38 is of a fixed, small diameter, referred to herein as a "pin hole." Alternatively, the aperture 38 may contain a lens, as will be further described below.

The slot 14 for receiving the card 20 is disposed opposite the shield 36 from the optical sensor 32, parallel to the plane of the optical sensor 32. The slot 14 has upper and lower surfaces 52, 54 that provide guides for insertion of the card 20 into the imager 10. The upper surface 52 has a window 46 disposed in a position coincident with the matrix symbology 22 upon insertion of the card 20 to a maximum axial extent within the slot 14, and coincident with a tangent extending from the optical sensor 32 through the aperture 38. A position sensor 42 is disposed at a rear end 18 of the slot 14 to detect the presence of the card 20 at the maximum axial extent of the slot, and produces a corresponding electrical signal. A light source 34 is disposed within the dome portion 12 such that light is directly illuminated through the window 46 onto the matrix symbology 22. The light source 34 may comprise light emitting diodes (LED) or conventional bulbs. Preferably, the light source 34 would be disposed very close to the surface of the card 20 so that maximum light energy is illuminated onto the matrix symbology 22. The light source 34 may be triggered by the signal generated by the position sensor 42.

Disposed within the base portion 16 are one or more electronic circuit cards 44. The circuit cards contain control logic necessary to operate the imager 10, including receipt of the signal from the position sensor 42, as well as control and timing of the light source 34 and optical sensor 32. The circuit cards 44 may additionally have the capability to decode the pixel data received from the optical sensor 32, or may transmit the raw data to an external device for decoding. A power source, such as a battery may further be included with the circuit cards 44. Alternatively, the control logic and circuit cards for the imager 10 may be disposed at a location external to the imager, with an infrared light (IR) or radio frequency (RF) data link between the imager and the control logic. In this alternative embodiment, the imager 10 would include an IR or RF transmitter.

Upon insertion of the card 20 to the maximum axial extent of the slot 14, the matrix symbology 22 is illuminated by the light source 34. Light reflected from the matrix symbology 22 is transmitted through the aperture 38 onto the optical sensor 32. The optical sensor 32 converts the light energy into pixel data utilized by the control logic of the circuit boards 44 to decipher the encoded information of the symbology into alphanumeric or information.

As known in the art, depth-of-field, D, is proportional to an aperture's F number under the following equation:

$$D=2pFM^2$$

where p is pixel size and M is magnification. As the aperture size decreases, the F number increases, and the depth-of-field increases. It should be apparent that the imager 10 of this invention does not require either complex optics to focus the reflected light onto the optical sensor 34, or a variable aperture to control light intensity on the optical sensor. Depth-of-field is maximized because the light intensity can be high and the aperture can be small. The resulting depth-of-field can be dramatically greater than standard lensed systems. Thus, the symbology can be read over a greater range, and smaller, high density symbols can be read as well.

In an alternative embodiment of the invention, FIG. 4 illustrates a lens 56 disposed in the aperture of the shield 36. The lens 56 provides focusing of the matrix symbology 22 onto the optical sensor 32. By providing a larger opening over a pin hole aperture, the embodiment of the imager 10 having a lens yields a substantial increase in the amount of light provided to the optical sensor 32 with only a minor increase in imager complexity.

Having thus described a preferred embodiment of a matrix symbology imager, it should be apparent to those skilled in the art that certain advantages of the within system have been achieved. It should also be appreciated that various modifications, adaptations, and alternative embodiments thereof may be made within the scope and spirit of the present invention. For example, the imager 10 may further be equipped with a device for notifying the operator of the imager that the matrix symbology on the card has been successfully scanned, such as a light or audible tone.

The invention is further defined by the following claims.

What is claimed is:

1. A device for reading information from a card containing encoded data in the form of a two-dimensional matrix symbology, comprising:

a housing;

means for receiving said card into said housing having an axial extent thereof;

means for illuminating said matrix symbology of said card upon reaching said axial extent;

a lensless aperture aligned with said matrix symbology, light illuminated onto said matrix symbology by said illuminating means being reflected through said aperture; and means for optically converting said light reflected from said matrix symbology to information signals.

2. The device of claim 1, wherein said receiving means further comprises a slot dimensioned to receive said card.

3. The device of claim 2, further comprising a position sensor disposed within said slot at said axial extent, said position sensor detecting presence of said card at said axial extent and producing an associated signal.

4. The device of claim 1, wherein said illuminating means further comprises at least one light emitting diode (LED).

5. The device of claim 3, wherein said illuminating means is triggered by said signal from said position sensor.

6. The device of claim 1, wherein said converting means further comprises a charge coupled device (CCD).

7. A two-dimensional matrix symbology reader, comprising:

a fixed housing;

a slot disposed in said housing to receive a medium having said matrix symbology affixed thereto;

means for illuminating said matrix symbology within said housing upon said medium reaching an axial extent of said slot;

a lensless aperture within said housing adjacent to said slot, said aperture being disposed to receive reflected light illuminated onto said matrix symbology; and means for optically converting said light reflected from said matrix symbology to information signals representative of said matrix symbology.

8. The reader of claim 7, wherein said medium comprises a card.

9. The reader of claim 7, further comprising a position sensor disposed within said slot at said axial extent, said position sensor detecting presence of said medium at said axial extent and producing an associated signal.

10. The reader of claim 9, wherein said illuminating means is triggered by said signal from said position sensor.

11. The reader of claim 7, wherein said converting means further comprises a charge coupled device (CCD).

12. The reader of claim 7, wherein said illuminating means further comprises at least one light emitting diode (LED).

13. The reader of claim 7, further comprising means for alerting a user of said reader upon completion of said conversion of said reflected light to said information signals.

14. A device for reading information from a medium containing encoded data in the form of a two-dimensional matrix symbology, comprising:

a housing;

a slot disposed in said housing to receive said medium having a position sensor disposed at an axial extent of said slot, said position sensor detecting presence of said medium at said axial extent and producing an associated signal;

means for illuminating said matrix symbology of said card upon reaching said axial extent, said illuminating means being triggered by said signal from said position sensor;

a lensless aperture aligned with said matrix symbology, light illuminated onto said matrix symbology by said illuminating means being reflected through said aperture; and means for optically converting said light reflected from said matrix symbology to information signals.

15. The device of claim 14, wherein said converting means further comprises a charge coupled device (CCD).

16. The device of claim 14, wherein said illuminating means further comprises at least one light emitting diode (LED).

17. The device of claim 14, further comprising means for alerting a user of said device upon completion of said conversion of said reflected light to said information signals.

18. A method for reading a two-dimensional matrix symbology disposed on a medium, comprising:

inserting said medium into a receiving slot disposed in a housing;

illuminating said matrix symbology within said housing upon said medium reaching an axial extent of said slot, said housing further comprising a lensless aperture adjacent to said slot, said aperture being disposed to receive reflected light illuminated onto said matrix symbology; and optically converting said light reflected from said matrix symbology to information signals representative of said matrix symbology.

19. The method of claim 18, further comprising the step of detecting presence of said medium at said axial extent and producing an associated signal.

20. The method of claim 18, further comprising the step of alerting a user upon completion of said converting step.

21. A device for reading information from a card containing encoded data in the form of a two-dimensional matrix symbology, comprising:

a housing;

means for receiving said card into said housing having an axial extent thereof, said receiving means including a window;

means for illuminating said matrix symbology of said card upon reaching said axial extent;

an aperture aligned with said matrix symbology and said window, light illuminated onto said matrix symbology by said illuminating means being reflected through said aperture, said aperture comprising a lens;

means for optically converting said light reflected from said matrix symbology to information signals; and a shield disposed between said illuminating means and said converting means, wherein said shield contains said aperture.

* * * * *